United States Patent [19]

Riedel

[11] Patent Number: 4,861,206

[45] Date of Patent: Aug. 29, 1989

[54] STRADDLING PLUG

[75] Inventor: Josef Riedel, Überlingen, Fed. Rep. of Germany

[73] Assignee: Tox-Dübel-Werk Richard M. Heckhausen GmbH & Co. KG, Fed. Rep. of Germany

[21] Appl. No.: 123,937

[22] Filed: Nov. 23, 1987

[30] Foreign Application Priority Data

Nov. 26, 1986 [DE] Fed. Rep. of Germany ....... 3640312

[51] Int. Cl.[4] .............................................. F16B 13/06

[52] U.S. Cl. ........................................ 411/36; 411/37; 411/411; 411/412; 411/417

[58] Field of Search .............................. 411/36, 37–38, 411/34–35, 71–73, 908, 16, 57, 59, 411, 412, 414, 415, 417, 418, 420, 421

[56] References Cited

U.S. PATENT DOCUMENTS

| | | | |
|---|---|---|---|
| 2,017,421 | 10/1935 | Post | 411/38 |
| 2,487,296 | 11/1949 | Bergstrom | 411/411 X |
| 3,199,398 | 8/1965 | Weisz | 411/57 |
| 3,283,642 | 11/1966 | Ott | 411/57 |
| 3,487,442 | 12/1969 | Rossmann | 411/411 X |
| 3,735,665 | 5/1973 | Mortensen | 411/36 |
| 3,748,949 | 7/1973 | Dreger | 411/411 |
| 3,911,781 | 10/1975 | Bappert | 411/418 |
| 3,942,407 | 3/1976 | Mortensen | 411/36 |
| 4,036,559 | 7/1977 | Whitchurch | 411/415 |
| 4,576,534 | 3/1986 | Barth et al. | 411/412 |
| 4,600,224 | 7/1986 | Blose | 411/411 X |
| 4,600,225 | 7/1986 | Blose | 411/411 X |
| 4,625,194 | 3/1987 | Tajima et al. | 411/417 |
| 4,655,661 | 4/1987 | Brandt | 411/412 X |

FOREIGN PATENT DOCUMENTS

| | | | |
|---|---|---|---|
| 325832 | 11/1975 | Austria . | |
| 331480 | 8/1976 | Austria . | |
| 0037091 | 10/1981 | European Pat. Off. . | |
| 1253959 | 11/1967 | Fed. Rep. of Germany . | |
| 2026456 | 12/1970 | Fed. Rep. of Germany . | |
| 1775188 | 12/1971 | Fed. Rep. of Germany . | |
| 2254602 | 11/1972 | Fed. Rep. of Germany . | |
| 1500738 | 10/1973 | Fed. Rep. of Germany | 411/73 |
| 3336277 | 5/1984 | Fed. Rep. of Germany | 411/417 |
| 3447415 | 6/1986 | Fed. Rep. of Germany . | |
| 1340396 | 9/1963 | France . | |
| 1533353 | 6/1968 | France | 411/36 |
| 2260017 | 8/1975 | France . | |
| 417227 | 1/1967 | Switzerland | 411/72 |
| 518460 | 3/1972 | Switzerland . | |
| 406083 | 2/1934 | United Kingdom . | |
| 455280 | 10/1936 | United Kingdom | 411/72 |
| 598730 | 3/1948 | United Kingdom . | |
| 1495645 | 12/1977 | United Kingdom . | |

*Primary Examiner*—Gary L. Smith

*Assistant Examiner*—Curtis B. Bueske

*Attorney, Agent, or Firm*—Ostrolenk, Faber, Gerb & Soffen

[57] ABSTRACT

A plastic straddling or expansion plug having a closed plug neck and a closed plug foot both with a longitudinal aperture into which a screw can cut a thread. The plug includes a shank having a thin plug jacket on which a two-flight helix is integrally formed. In the region between the helices, the plug jacket is provided with longitudinal slits. On the outside of the helix, further ribs are provided which each extend over a 180° arc and are integrally formed with the helix, alternating in orientation by a 90° angle. The plug neck includes flange lugs oriented in the shape of a cross and adapted to be folded over.

14 Claims, 3 Drawing Sheets

22 20 18 10 16 44 46 48 14 40 34 44 46 32 24 12 30

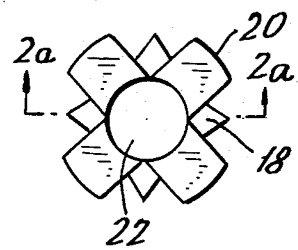
Fig. 1b
Fig. 1
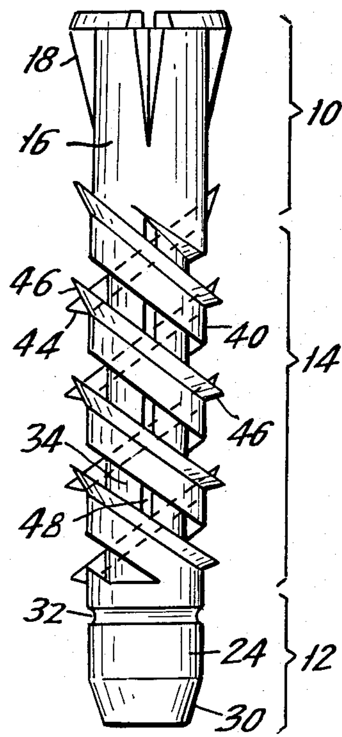
Fig. 2a
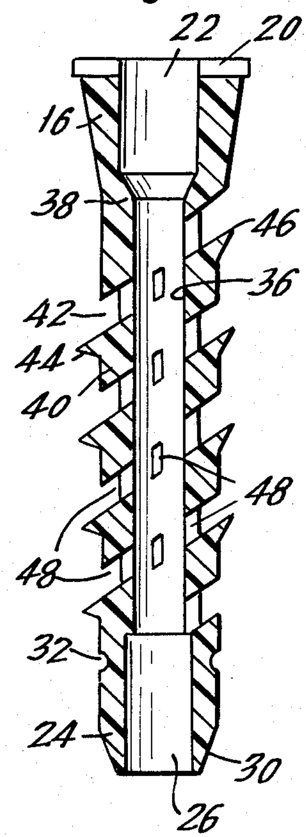
Fig. 2b
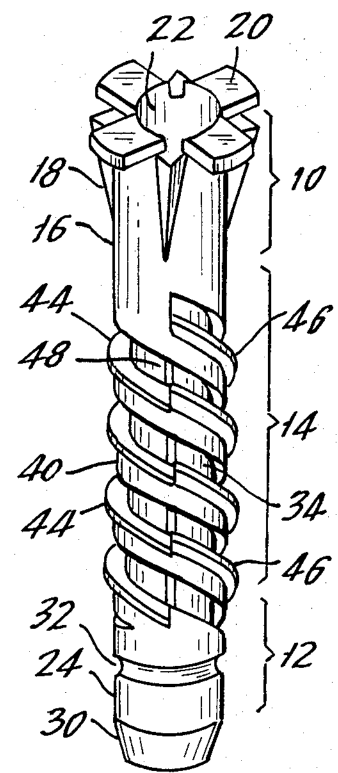
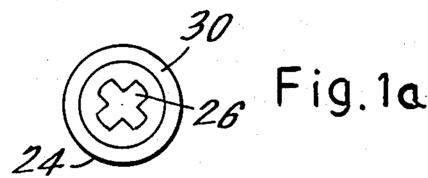
Fig. 1a 20
56
20
62
58
52
50

20
56
20
62
58
52
54

56
20
20
62
58
52
50

20
20
62
58
60
56

STRADDLING PLUG

BACKGROUND OF THE INVENTION

1. Field of the Invention

The invention relates to an expanding or straddling plug or dowel.

2. Description of the Related Art

A straddling plug, which can be used both as an outwardly spreading plug and as a buckling plug, is described in DE-PS No. 2,254,602 and AT-PS No. 325,832.

In this plug, the shank has annular ribs thereon and is made as a solid sleeve subdivided into spreading segments by longitudinal slits. In use, the spreading segments are pressed outwardly over a substantial portion of the shank length. This spreading pressure frequently cannot be withstood by the wall, particularly those of lightweight construction materials or soft or porous masonry. Often the walls are destroyed and the securing function is lost.

SUMMARY OF THE INVENTION

Accordingly, it is an object of the invention to provide a plug which can be used in solid masonry such as concrete, in addition to lightweight construction walls without damamging the wall.

These and other objects are achieved by providing a straddling plug which achieves a firm anchoring in hollow construction materials (by knotting) and in solid walls. The plug or dowel can also be used in lightweight building material such as Ytong, etc. A thin jacket is provided according to the invention in the shank portion of the plug and serves only as support for the threaded walls and not as a spreading element. The thin jacket maintains the shape of the plug on insertion into the drill hole and maintains the thread flights of the threaded walls at predetermined intervals. In a short drill hole, the rupturable jacket may be upset by hammering the plug into the hole, since the thin jacket sleeve ensures axial (and radial) resiliency. On screwing or hammering in an expansion element (a screw or nail) the thin jacket is destroyed and the flights of the helix, which alone act as spreading or expansion elements, engage the drill hole wall. Between the helix threads or flights the drill hole wall remains substantially free of expanding pressures so that there is no danger of damage. On screwing in a right-hand threaded screw the left-hand helix ensures an axial stressing of the plug shank by the friction which the helix exerts on the drill hole.

The plug foot enables the plug to be used as a buckling plug. When the screw head bears on the part to be secured and is further turned the free plug portion buckles outwardly and forms a knot on the back of the cavity. To facilitate this buckling out at the foot portion a desired buckling point is provided in the form of a groove.

The essence of the invention therefore is that the plug shank is formed substantially by the helix as an expansion segment and the thin-walled jacket or surface carrying the helix serves only to maintain its position, i.e., the spacing of the helix, on insertion of the plug into the drill hole. On screwing an expansion body into the plug the thin jacket is destroyed without restricting the spreading function. The actual anchoring elements are the expandable helices or convolutions which ensure reliable force transmission to masonry of any type.

Other objects and features of the invention will become apparent from the following description and accompanying drawings.

BRIEF DESCRIPTION OF THE DRAWING

FIG. 1 is a side view of a straddling plug of the present invention;

FIG. 1*a* is an axial view of the plug according to FIG. 1 seen from the side of the plug foot;

FIG. 1*b* is an axial view of the plug according to FIG. 1 seen from the plug head;

FIG. 2*a* is an axial section of the plug illustrated in FIG. 1 along lines *2a*—*2a* of FIG. 1*b*.

FIG. 2*b* is a perspective view of the plug according to FIG. 1;

DETAILED DESCRIPTION OF THE PREFERRED EMBODIMENTS

The plug of the present invention comprises a plug neck 10, a plug foot 12 and an expandable plug shank 14 disposed between plug foot 12 and plug neck 10.

Figures 5, 6:
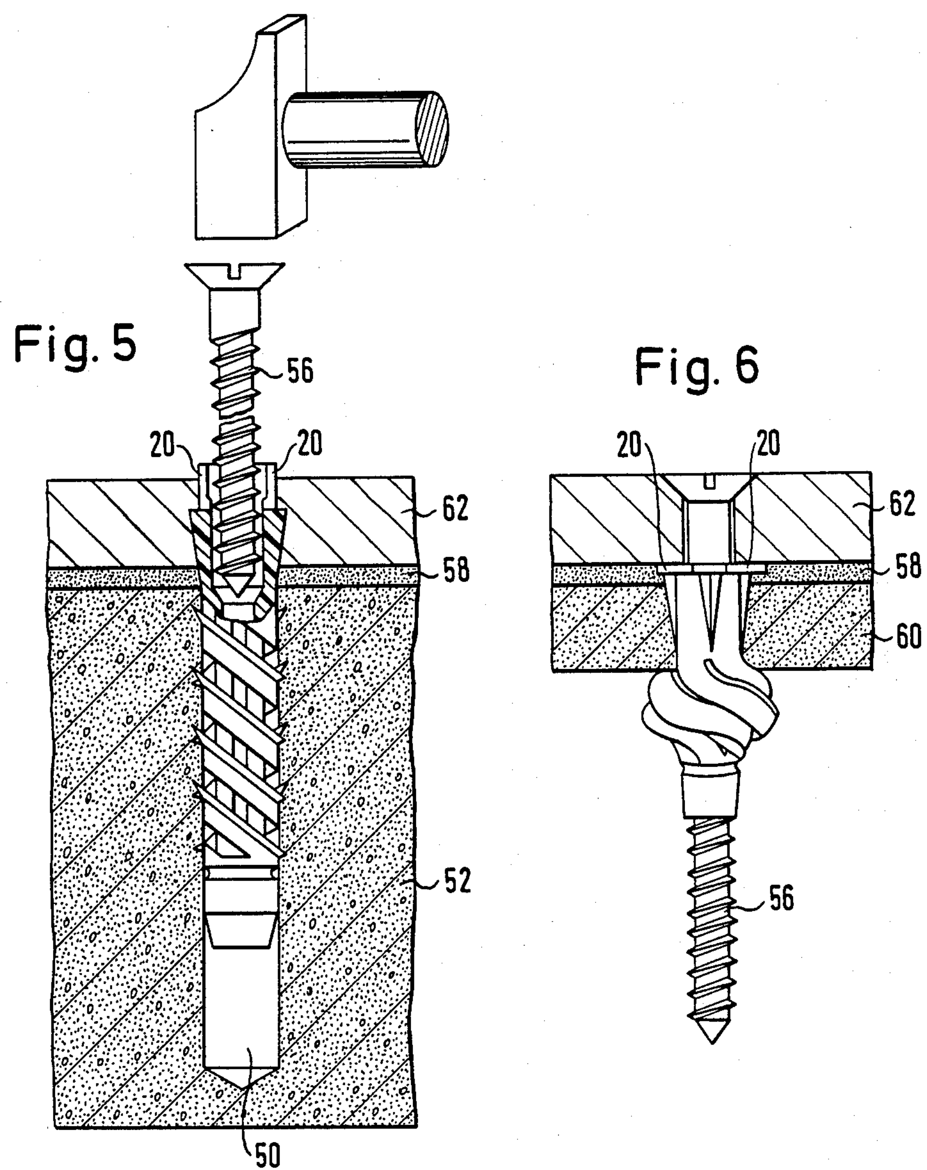
FIG. 5 is a schematic view of the plug according to FIG. 1 when being used in a push-through assembly.
FIG. 6 is a schematic view of the plug placed in hollow construction materials with straddling or knotting of the plug shank.

The plug neck 10 comprises a closed sleeve 16 having ribs 18 on the outside which taper axially towards the plug shank 14. Four ribs may be provided at equal angle intervals of 90° with respect to each other. Between the ribs 18 at the upper end of the closed sleeve 16, radially outwardly projecting flange lugs 20 are integrally formed in the shape of a cross and which can fold over upwardly (FIG. 5). The plug neck 10 includes a longitudinal aperture screw insert 22 having a relatively large diameter so that a matching screw can pass through with its shank not exerting any force on aperture 22.

The plug foot 12 comprises a closed sleeve 24 having longitudinal aperture 26 into which a matching screw can cut a thread. The aperture 26 (FIG. 1*a*) is cross-shaped or polygonal in cross-section. The plug foot 12 comprises a conically shaped insert end 30 which penetrates into the drill hole. An encircling annular groove 32 is disposed at the transition between the plug foot 12 and plug shank 14 and the annular groove 32 acts at a hinge or buckling point so that on installation into hollow brick or hollow bodies the segments of the plug shank can spread freely outwardly without tearing the plug foot apart.

The plug shank 14 comprises a thin inner plug case or jacket 34 in the form of an interrupted spacer sleeve surrounding a cylindrical expansion channel 36. Widening 38 of channel 36 merges into the insert hole 22. Channel 36 has a diameter which is less than the spreading portion of the matching expansion screw. Plug jacket 34 has integrally formed on its outer side a helix or screw thread 40 which, as seen in FIG. 1, has the form of a two-flight left-hand thread. The cross-section of the helix 40, as seen in FIG. 2*b*, may be a parallelogram, but may also be rhombic, trapezoidal or in the form of an irregular quadrilateral. Between the helices, a helical groove 42 is located outside the plug jacket 34 which preferably has a parallelogram-like cross-section. On the outside of the helix 40, at the edge facing the plug neck 10, shallow further ribs or scales 44 or 46 are integrally formed as barbs on the plug shank These ribs each extend over segments of shank 14 in 180° arcs, alternating in orientation 90° with respect to the previous segment. Transition points of the ribs 46 and 44 have "jumps" at the change from rib 44 to 46 in that the planes of the ribs or scales are substantially perpendicular to each other at the transitions.

The plug jacket 34 includes longitudinal slits 48 between the individual flights of the helix 40, which facilitate deformation of the plug.

Figure 3:
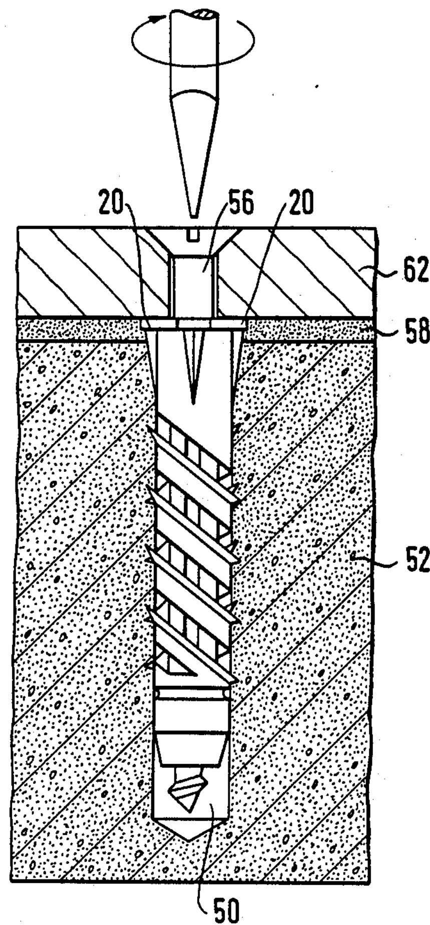
FIG. 3 is a schematic view of a plug assembly placed in solid construction material.

The plug acts as a straddling plug when it is inserted into a matching plug hole 50 (FIG. 3) in a solid wall 52 of concrete. On screwing a screw 56 into the plug the segments formed by the helix spread outwardly as apparent from FIG. 3. The screw 56 digs into the plug foot, cutting a thread therein. This results in axial upsetting, increasing the expansion pressure.

The flange lugs 20 bear on the plaster layer 58 and no expansion of the plug takes place in this region. As can be seen in FIGS. 3 to 6, a plate 62 is secured to the masonry. Any other desired article could be secured by the screw.

Figure 4:
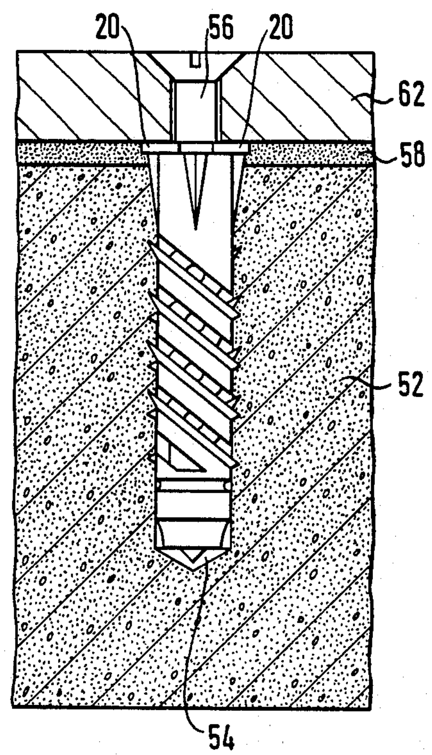
FIG. 4 is a schematic view of the plug assembly according to FIGS. 1 and 2 placed in solid construction material when the plug hole is too short and the plug shank is upset.

As can be seen in FIG. 4, while the plug hole 54 has turned out too short, the plug nevertheless can be hammered into the plug hole because the helix arrangement in conjunction with the thin plug jacket 34 can be longitudinally upset before the screw 56 is screwed therein. On screwing the screw into the plug, expansion again takes place within the solid material.

As shown in FIG. 5, the plug according to the invention is also suitable for a through assembly. In this case the plug is inserted through the hole in the plate 62 and the plug hole, and the screw is then knocked in with a hammer, the flange lugs 20 folding over so that the plug can be driven in up to the desired depth.

As can be seen in FIG. 6, the plug may be inserted into hollow construction material 60. The screw cuts a thread into the plug foot, buckling the helices outward and knotting them so that a firm bracing against the hollow construction material is ensured.

Apart from the example of the embodiment illustrated, inclined interrupted ribs extending parallel to the pitch may be provided at the outer diameter of the thread helices on the right or left or on both sides. This while providing a further reinforcement of the anchoring of the plug. The plug according to the invention then acts as a straddling plug or buckling plug depending on the material which is sued so that the plug can be employed both in solid masonry and in hollow construction materials such as hollow bricks, sandwich-type plasterboards, etc.

By dividing the flange into flange lugs projecting radially in a cross shape, they function as a cap plug. When a nail or screw is inserted in the plug, however, the flange lugs are folded over 90° and disappear into the drill hole.

Although the present invention has been described in connection with preferred embodiments thereof, many other variations and modifications will now become apparent to those skilled in the art. It is preferred, therefore, that the present invention be limited not by the specific disclosure herein, but only by the appended claims.

I claim:

1. A plastic straddling and buckling plug for placing a screw in a surface, comprising:

a neck having a longitudinal aperture for receiving the screw;

an expandable shank attached at one end to the neck, the shank having a rupturable jacket with a plurality of longitudinal slits and a support rib helically oriented about the outside of the jacket, the jacket supporting the rib while the plug is positioned in the surface; and, a foot attached to another end of the shank, the foot having a longitudinal aperture for threadably receiving the screw.

2. A plug as claimed in claim 1, wherein the ribs are left-handed, helically oriented ribs.

3. A plug as claimed in claim 1, wherein the rib has a cross section which is selected from the group consisting of parallelogram-, trapezoidal-, saw-tooth-, or triangular-shaped.

4. A plug as claimed in claim 1, further comprising a further rib attached to the exterior of the support rib and projecting outwardly for gripping the surface.

5. A plug as claimed in claim 4, wherein the further rib has a trapezoidal cross-section with an edge oriented outward.

6. A plug as claimed in claim 5, wherein the further rib starts at the end of the shank attached to the neck.

7. A plug as claimed in claim 4, wherein the further rib comprises a plurality of further rib segments each extending over an arc and each oriented at a different angle with respect to a previous segment.

8. A plug as claimed in claim 7, wherein the arc is substantially a 180° arc.

9. A plug as claimed in claim 7, wherein the angle is substantially a 90° angle.

10. A plug as claimed in claim 1, wherein the longitudinal slits are defined by, and extend between, the helices of the support rib.

11. A plug as claimed in claim 1, wherein the rib forms a multi-flight helix.

12. A plug as claimed in claim 1, further comprising a plurality of flange lugs attached to the neck, the lugs being bendable upward for placing the plug in the surface.

13. A plug as claimed in claim 12, wherein the flange lugs are arranged in a cross-shape.

14. A plug as claimed in claim 1, wherein the longitudinal aperture of the foot has a cross-section which is cross-shaped.

* * * * *